(12) United States Patent
Poplawski et al.

(10) Patent No.: US 8,417,628 B2
(45) Date of Patent: Apr. 9, 2013

(54) ELECTRONIC BILL PRESENTMENT AND PAYMENT SYSTEM AND METHOD

(75) Inventors: Thomas Poplawski, New York, NY (US); Khoon-Hong Tan, Summit, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 2382 days.

(21) Appl. No.: 09/772,601

(22) Filed: Jan. 30, 2001

(65) Prior Publication Data
US 2003/0208441 A1 Nov. 6, 2003

Related U.S. Application Data

(60) Provisional application No. 60/215,003, filed on Jun. 29, 2000.

(51) Int. Cl.
*G06Q 40/00* (2012.01)
(52) U.S. Cl. .......... 705/39; 705/40; 705/41; 705/42; 705/43; 705/44; 705/45
(58) Field of Classification Search .......... 705/34, 705/39–45; 364/406
See application file for complete search history.

(56) References Cited

U.S. PATENT DOCUMENTS

| | | | | |
|---|---|---|---|---|
| 5,465,206 A * | 11/1995 | Hilt et al. | ......... | 705/40 |
| 5,669,528 A | 9/1997 | Romero et al. | | |
| 5,699,528 A * | 12/1997 | Hogan | ......... | 705/40 |
| 5,963,925 A | 10/1999 | Kolling et al. | | |
| 6,070,150 A | 5/2000 | Remington et al. | | |
| 6,078,907 A * | 6/2000 | Lamm | ......... | 705/40 |
| 6,128,603 A * | 10/2000 | Dent et al. | ......... | 705/40 |
| 6,188,994 B1 | 2/2001 | Egendorf | ......... | 705/40 |
| 6,292,789 B1 * | 9/2001 | Schutzer | ......... | 705/40 |
| 6,374,229 B1 * | 4/2002 | Lowrey | ......... | 705/34 |
| 6,385,595 B1 * | 5/2002 | Kolling et al. | ......... | 705/40 |
| 6,578,015 B1 * | 6/2003 | Haseltine et al. | ......... | 705/34 |
| 6,609,113 B1 * | 8/2003 | OLeary | ......... | 705/39 |
| 6,678,664 B1 * | 1/2004 | Ganesan | ......... | 705/39 |
| 2002/0065772 A1 * | 5/2002 | Saliba et al. | ......... | 705/40 |

FOREIGN PATENT DOCUMENTS

CA 2275211 6/1998

* cited by examiner

*Primary Examiner* — Daniel Felten
(74) *Attorney, Agent, or Firm* — Goodwin Procter LLP

(57) ABSTRACT

A method and system using a communication network such as the Internet to allow registered users the flexibility to pay a bill by using traditional non-electronic payment methods after receiving an e-mail notification. The e-mail notification contains at least summary information which is formatted in the form of a remittance which can be included with the non-electronic form of payment allowing a user to retain the ability to pay a bill non-electronically while still being electronically notified that the bill is coming due. Additionally, a registered user has the option to pay a bill electronically after receiving the e-mail by clicking on an appropriate web address embedded within that e-mail. The registered user will either be directed to a biller website or a Customer Service Provider (CSP) and/or a Business Service Provider (BSP) website and given the option to pay the bill electronically.

32 Claims, 6 Drawing Sheets

ELECTRONIC BILL PRESENTMENT AND PAYMENT SYSTEM AND METHOD

CROSS-REFERENCE TO RELATED APPLICATION

This application is related and claims priority to U.S. provisional patent application Ser. No. 60/215,003, filed Jun. 29, 2000, entitled ELECTRONIC BILL PRESENTMENT AND PAYMENT SYSTEM AND METHOD, the entirety of which is incorporated herein by reference.

The present invention generally relates to a system and method for Electronic Bill Presentment and Payment (EBPP) and more specifically to a system and method for EBPP providing flexible options for both billers and payers.

FIELD OF THE INVENTION

Background of the Invention

Many financial experts believe that the banking industry is on the brink of a revolution in the area of EBPP. Consumers are starting to realize the convenience of electronic bill payment and billers are recognizing the reduced costs and reductions in late and delinquent payments provided by EBPP.

Nevertheless, some problems exist in the present electronic bill paying systems that limits widespread acceptance among payers and billers alike. Consumers are naturally skeptical of a system that seems to lessen their ability to control their resources. Present electronic bill paying systems do not facilitate the kind of control that payers are accustomed to having in a traditional paper system such as cash or checks.

A further problem exists in that payers have diverse computer hardware, software and expertise. Conventional EBPP systems require a payer to install special software to view a scanned copy of a bill. Billers face the problem of having to be able to accommodate all kinds of payers, with all kinds of diverse hardware and software systems.

Furthermore, in prior EBPP systems, if a payer wanted to pay a bill by another means, i.e., send a check, the payer is left without a remittance slip to accompany the check.

Accordingly, there is a need for an EBPP system that allows a payer some measure of flexibility and control over a payment while offering the benefits of an electronic bill paying system. The EBPP system should allow billers to electronically present bills to all payers regardless of the payer's particular computer configuration or expertise.

SUMMARY OF THE INVENTION

The present invention allows a payer to decide how a specific bill will be processed. The payer receives an e-mail notification containing summary information with respect to a pending bill and can issue a paper check or schedule an electronic payment of the bill using the EBPP system. The summary information can either be contained in the body of the e-mail message or linked as an attachment to the e-mail.

A copy of the summary information contained in or attached to the e-mail presentment message is in the form of a remittance slip as is found in a traditional paper based bill. The bill recipient is able to print out the remittance slip which can then be included by the payer along with the non-electronic form of payment (e.g. cash or check).

The present invention allows the payer to view a full copy of the bill within the chosen browser environment. The e-mail presentment message preferably includes an embedded Uniform Resource Locator (URL) that is "clickable" enabling the payer to go directly to a web site containing the full billing information. If the payer's e-mail program does not support embedded URL's, a link address can be copied and pasted into the payer's browser. No special software is required other than the program (e.g., browser) the payer uses to access the Internet.

Another advantage of the present invention is that the biller transparently sends bill information to a customer service provider (CSP) and/or a Biller Service Provider (BSP) which generates an HTML formatted copy of the bill for use by the payer.

Yet another aspect of the present invention is that the biller has two hosting options available. The biller can choose to host the registration, log-in and authentication on its own site. Alternatively, the biller can allow a CSP/BSP to provide the complete hosting required to allow payers to utilize the present invention.

DETAILED DESCRIPTION OF THE DRAWINGS

Figure 1:
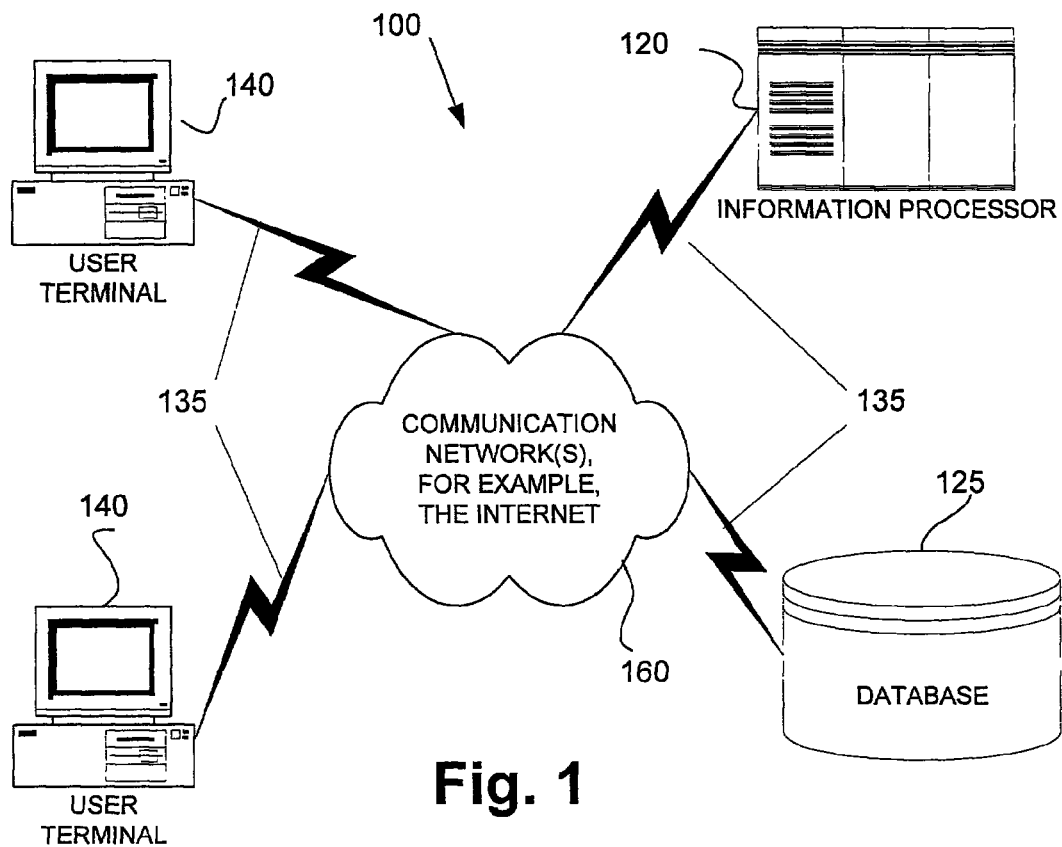
FIG. 1 is a diagram of an example hardware arrangement for an electronic bill presentment and payment method and system constructed in accordance with the principles of the present invention.

Referring now to the drawings in which like reference numbers refer to like elements, there is shown in FIG. 1 a diagram of an example of an electronic bill presentment and payment (EBPP) system shown generally as 100 comprises one or more information processors, one or more databases 125 and one or more user terminals 140. Although information processor 120 is shown separate from database 125, database 125 could be contained within processor 120. Database 125 can communicate with information processor 120 via connection 160 using any known communication method, including a direct serial or parallel interface or via a local or wide area network (for example, the Internet).

User terminals 140 and information processors 120 communicate over data connection 135 through communication network 160. Communication network 160 can be any communication network, but is preferably the Internet or some other global computer network. Data connection 135 can be any known arrangement for accessing communication network 160 such as dial-up serial line interface (SLIP), protocol point-to-point protocol (PPP), integrated services digital network (ISDN), dedicated leased line servers, broadband (cable) access, frame relay, digital subscriber line (DSL), asynchronous transfer mode (ATM), or any other acceptable access technique.

User terminals 140 have the ability to send and receive data across communication network 160 and the ability to display the received data on a display device using appropriate communication software such as an Internet web browser. By way of example, terminals 140 may be personal computers such as INTEL, Pentium-based computers or APPLE, Macintosh computers, but are not limited to such computers. Other terminals which can communicate over a global computer network, such as palm top computers, personal digital assistance (PDAs) and mass marketed Internet access devices, i.e., WebTV can be used.

According to the present invention, user terminals 140 access communication network 160 and receive an electronic notification from a CSP/BSP notifying the user of a billing obligation. The notification is generally in the form of an email with that email being printable as is known in the art.

Figure 2:
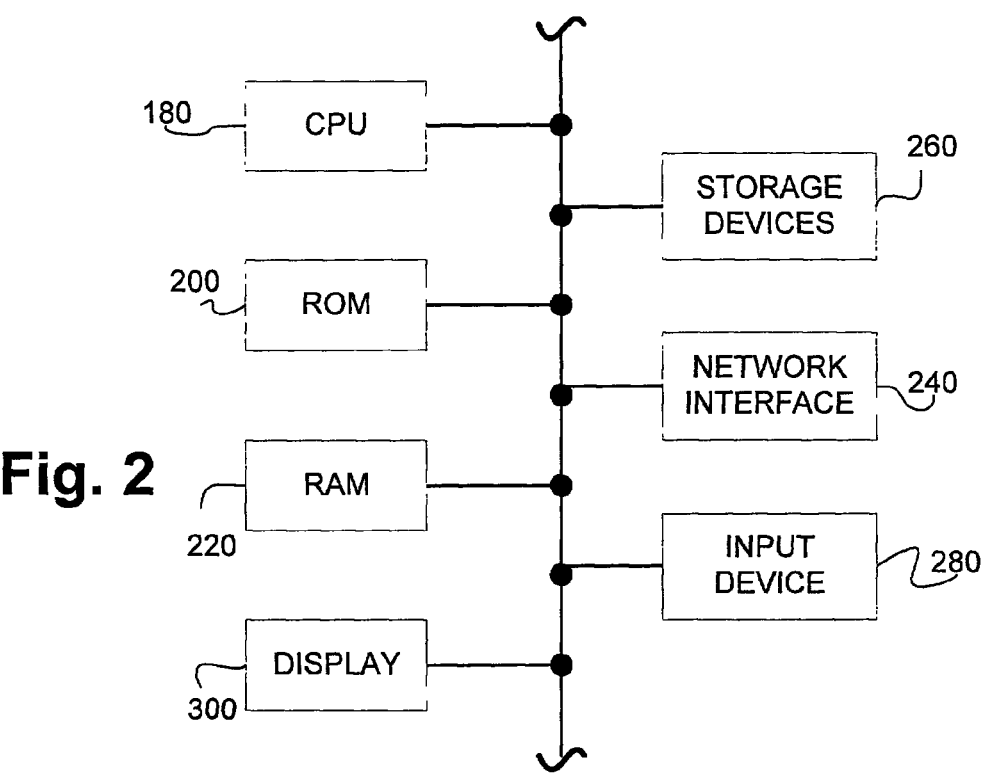
FIG. 2 is a block diagram of the functional elements of site processors and user terminals constructed in accordance with the principles of the present invention.

As shown in FIG. 2, the functional elements of information processor 120 include a central processing unit (CPU) 180 used to execute software code in order to control the operation of the information processor 180, read only memory (ROM) 200, random access memory (RAM) 220, at least one network interface 240 to transmit and receive data to and from other computing devices, such as user terminals 140, a storage device 260 such as a floppy disk drive, hard disk drive, tape drive, CD rom and the like for storing program code, database as application data, and one or more input devices 280 such as a keyboard and a mouse.

The various components of information processor 120 need not be physically contained within the same chassis or even located at a single location. For example, storage device 260 may be located at a site which is remote from the remaining elements of information processor 120 and may even be connected to CPU 180 across communication network 160 via network interface 240.

The nature of the invention is such that one of ordinary skill in the art of writing computer executable code (software) will be able to implement the described functions using one or a combination of popular computing programming languages.

One of the functions performed by information processor 120 is that of hosting a website for the establishment and administration of user billing information. A website typically communicates with web browsers using the hypertext transfer protocol (HTTP) to send and receive data, including HTML web page data and executable JAVA applets. Of course any known data transfer protocol and website definition language can be used to implement the present invention.

As used herein, references to displaying data on a terminal refer to the process of communicating data to user terminal 140 across communication network 160, and processing the data such that the data can be viewed on the user terminal 140 using an Internet browser or the like. A display screen on user terminal 140 displays data which allows a user to "move" from website to website, and even to display a composite image comprised of data gathered from multiple websites.

Figure 4:
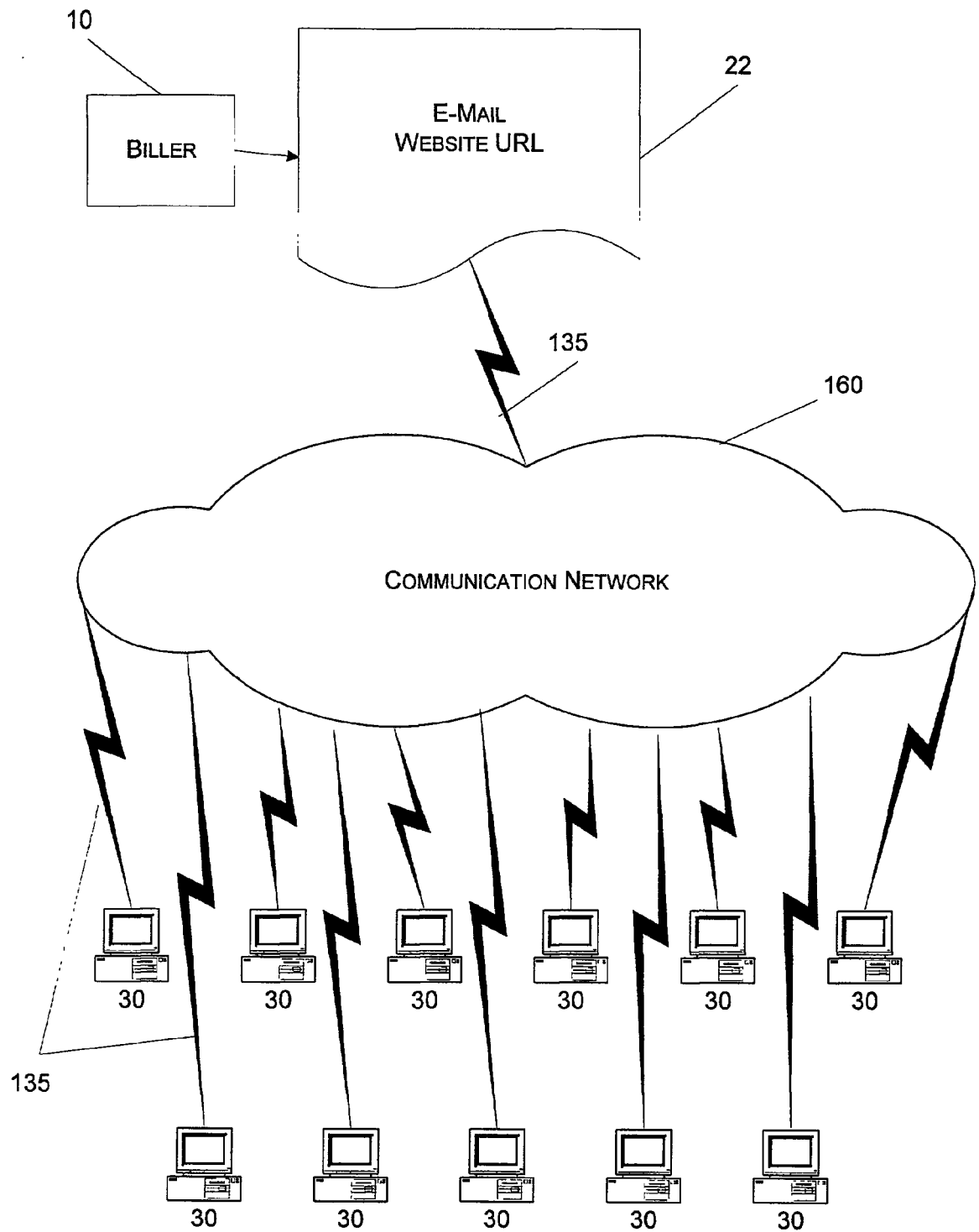
FIG. 4 shows the initial contact with payer according to the present invention.

FIG. 4 illustrates the process for registering payers 30 to sign-up as users of the present invention. Billers 10 initiate contact with customers 30 by notifying them of the option to register for the EBPP service according to the present invention. This notification is preferably by e-mail 22 which includes an embedded URL which directs the payer 30 to a website that enables the payer 30 to register for the service (as will be described in more detail below). Alternatively, the biller 10 can provide an insert to be included in a traditional paper-based invoice mailed to the payer 30 that describes the EBPP system and method and invites the payer 30 to enroll in the EBPP service.

Figure 3:
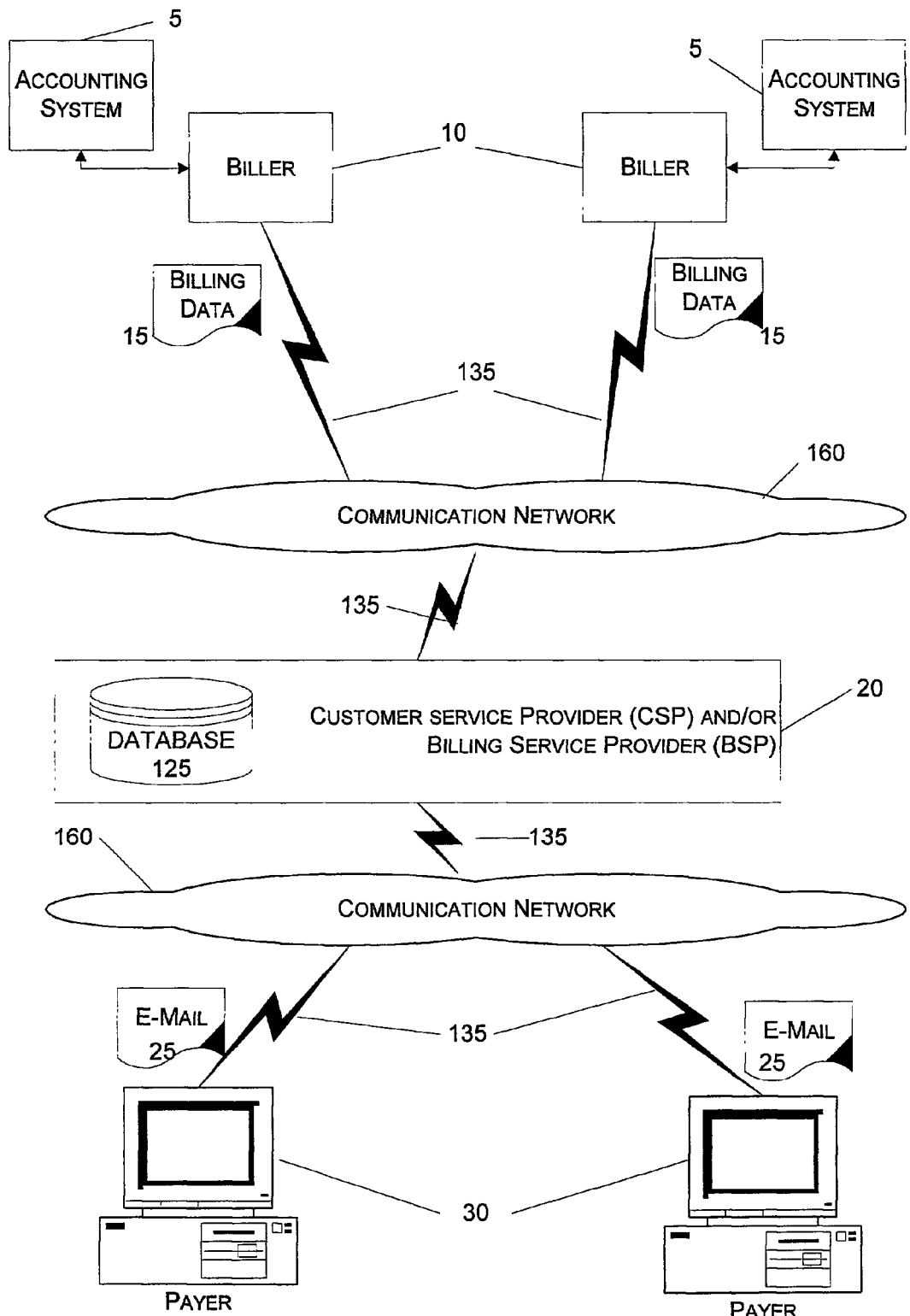
FIG. 3 illustrates the structure and transaction flow according to the present invention.
Figure 6:
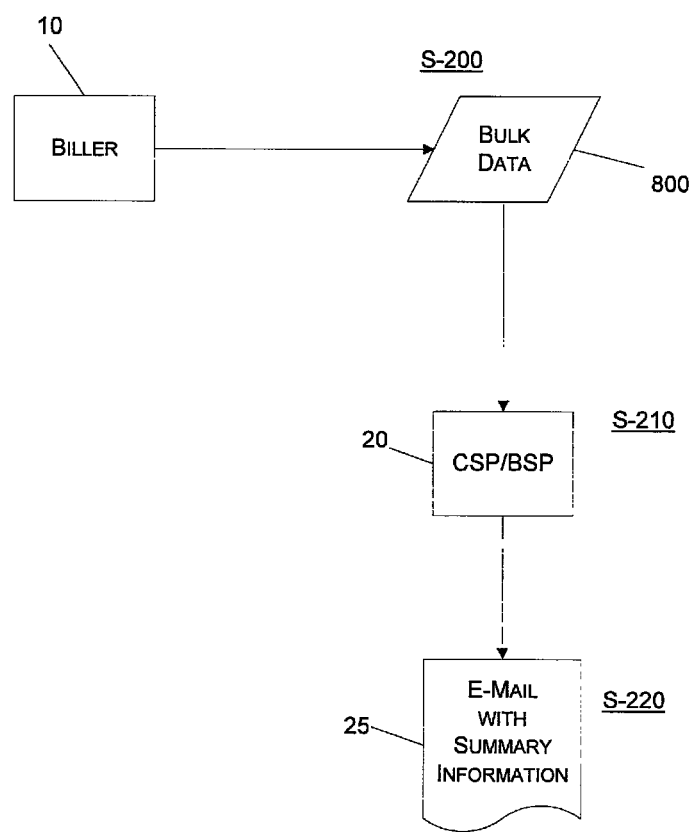
FIG. 6 is a flow chart illustrating the general data flow from biller to payer.

Referring to FIGS. 3 and 6, billers 10 typically utilize an accounting system 5 that includes computers and data input devices to collect and organize the billing data 15 as is known in the art. The billing data 15 is preferably sent as bulk billing data 800 containing all the billing data 15 for a specified period of time (e.g. one month) to the Customer Service Provider (CSP) and/or Business Service Provider (BSP) 20. The CSP/BSP 20 loads the bulk billing data 800 into a database 125. The CSP/BSP 20 utilizes computers, servers, and communication software and hardware to electronically accept the bulk billing data 800 as is known in the art. Using the data provided in the billing data 15 from the billers 10, the CSP/BSP 20 produces electronic notifications 25 (i.e., e-mails) that are sent to the payers 30 notifying them of an upcoming bill.

The CSP/BSP 20 generates the electronic notifications in the form of e-mail notifications 25 as discussed above. The e-mail notifications 25 are preferably transmitted to payers 30 via a communication network 160 such as the Internet. In one embodiment, the e-mail notifications 25 are sent directly to the payers 30. In an alternative embodiment, the email notifications 25 are transmitted to the payers 30 through a third party provider such as CheckFree™.

The e-mail notification 25 informs the payer 30 that a bill has been generated by the biller 10 for payment by the payer 30. The e-mail notification 25 contains at least summary information regarding the bill. The summary information can be included in the body of the e-mail 25 or can be included as an attachment.

Although FIG. 3 only shows two payers 30 and two billers 10, it is understood that the system and method of the present invention can support a plurality of billers 10 and a plurality of payers 30. Each CSP/BSP 20 can support a plurality of billers 10.

The summary level information included in the e-mail notification 25 is formatted in the same manner as a remittance slip in a traditional paper-based invoice. The summary information, therefore, includes at least the biller's name, statement date, minimum amount due and total amount due.

The e-mail notification 25 also includes an embedded URL which directs the payer 30 to a website where the full billing information may be viewed. Once at the web-site, the payer 30 is required to accomplish a log-on procedure as is known in the art such as by providing a proper user-name and password. Once authenticated, the payer 30 is able to view full billing information.

Figure 5:
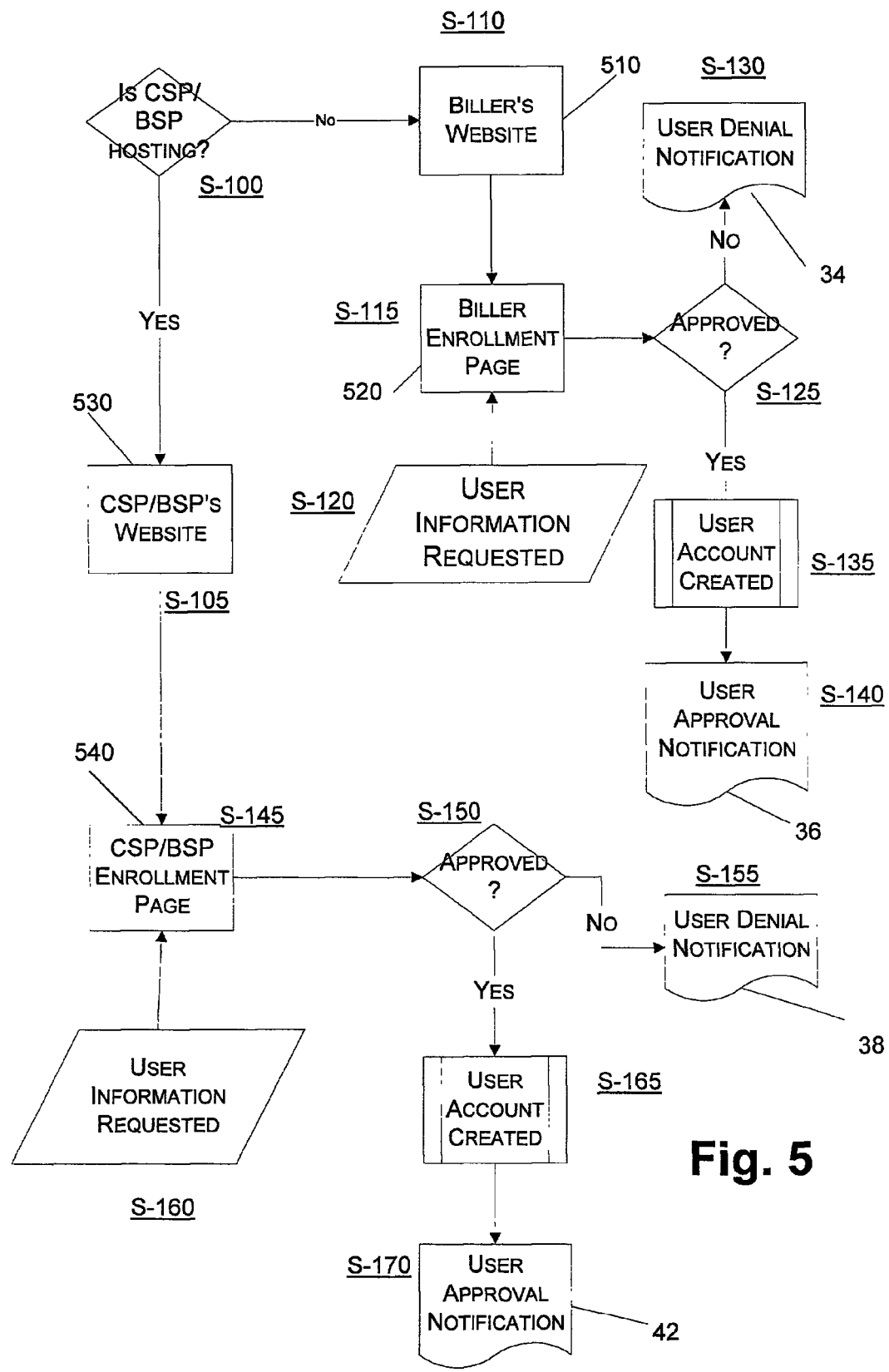
FIG. 5 is a flowchart outlining both a biller hosted and a CSP/BSP hosted system and method arranged in accordance with the present invention.
Figure 7:
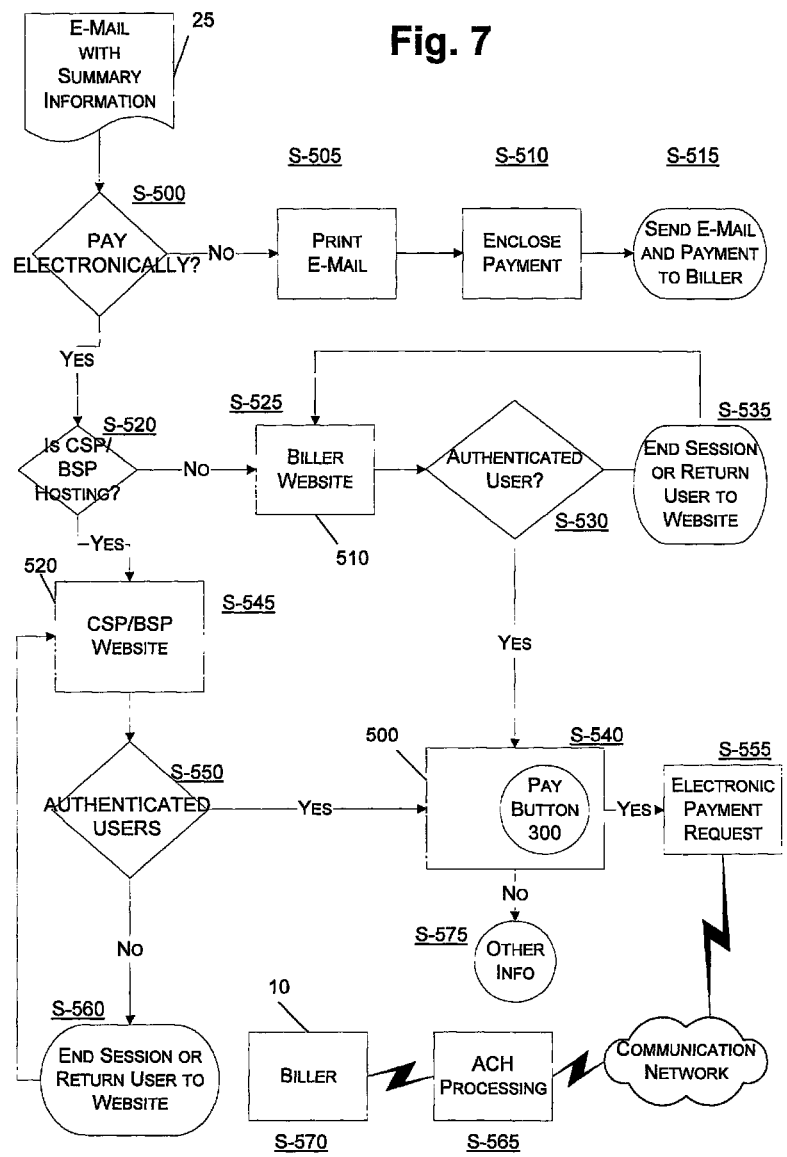
FIG. 7 is a flow chart detailing the payment options arranged in accordance with the present invention.

Referring to FIGS. 5 and 7, billers 10 have two options available to them with respect to hosting electronic access to the on-line information according to the present invention. The biller 10 can chose to host the enrollment, log-on and authentication of the payers 30 or have the CSP/BSP 20 host the enrollment, log-on an authentication. An advantage of the biller hosted embodiment is that the payer 30 is directed to the biller's website 510 directly by clicking on or typing in the URL contained in the email 25 (FIG. 3). This allows the biller to advertise or inform payers 30 of information selected by the biller 10.

In the biller hosted embodiment, the biller 10 must have computer hardware and software required to host the website 510. Alternatively, the biller 10 can let the CSP/BSP 20 handle all hosting operations. The biller choosing to let the CSP/BSP 20 host the system need not invest in the hardware and software needed to host the services but must pay the CSP/BSP 20 for performing this service.

Two alternative methods of enrolling the payer 30 are illustrated in FIG. 5. Of course, a user would only enroll through one or the other of these options since the end result of either method is a registered payer 30.

Referring now to FIGS. 4 and 5, email notification 22 contains the website URL to either the biller's website 510 or the CSP/BSP's website 530 depending on which option biller 10 chooses. In step S100, payer 30 is directed to the biller's website 510 (S-110) if the CSP/BSP 20 is not hosting the service. Payer 30 is directed to the biller's enrollment page 520 (S115). User information is requested including name, password selection and other security account information (S-120). If the user is approved (S-125), a user account is created (S-135) and a user approval notification 36 is sent out (S140). The user notification can contain a URL to the biller's website 510, password and any other information the biller 10 or CSP/BSP 20 chooses. If the user is denied enrollment, a notification 34 is sent out informing the user of the denial (S-130).

If the CSP/BSP 20 is hosting the service, the user is directed to the CSP/BSP's website 530 (S-105) and then directed to the CSP/BSP's enrollment page 540 (S-145). Again as in step S-120, user information is requested such as name, account number, password (S-160). If the user is approved (S-150) a user account is created (S-165) and a user approval notification 42 is sent to the user notifying him or her of the decision to approve enrollment (S-170). If the user is denied, a denial notification 38 is sent to the user (S-155).

FIGS. 3 and 6 illustrate the process by which billing information is transmitted from the biller 10 to the CSP/BSP 20 and notifying the payer 30 of an upcoming bill. As discussed earlier, the billing information is preferably sent as bulk billing data 800 (S-200) from the biller 10. Typically, the bulk billing data 800 originates from the biller's accounting system 5. The bulk billing data 800 is for a specified period of time, generally a month and includes all of the billing data 15 for all the participating payers 30 of the biller 10. The CSP/BSP 20 performs a formatting operation on the "raw" bulk billing data 800 in order to generate a billing summary (S-210) (e.g., biller name, minimum amount due, total due, etc.). Alternatively, the biller 10 itself can generate this summary information prior to the transmission to the CSP/BSP 20. The CSP/BSP 20 incorporates this summary information into an e-mail 25 and sends the e-mail notification 25 to the payer 30 informing him or her of the bill originating with the biller 10 (S-220). As described above, the email notification 25 also contains a URL that can be used by the payer 30 to connect to a website to view the full billing information.

As previously discussed, the e-mail 25 contains a summary of the bill that is detailed enough for the payer 30 to manually pay the bill using a traditional non-electronic form of payment such as by check, cash, money order or other non-electronic means and typically remits payment using traditional non-electronic means (e.g., by mail). A payer 30 using this option is automatically notified when a bill is due, but retains the ability to pay the bill using traditional methods.

Referring now to FIG. 7, the payer 30 receives the e-mail 25 and then decides whether or not to pay the bill electronically (S-500). If the payer 30 decides not to pay the bill electronically, the e-mail 25 is printed (S-505). A check, cash or money order or other non-electronic form of payment is included with the printed e-mail 25 and sent to the biller with the printed e-mail 25 serving as a remittance form ensuring proper crediting of the payer's account (S-515).

If payer 30 chooses to pay the bill electronically (S-500), he or she is directed to either the biller's website 510 or the CSP/BSP's website 520 depending upon the billing option chosen (S-520). In the case where the biller is hosting the service, the payer 30 is directed to the biller's website 510 (S-525). The payer must be authenticated to ensure that the user attempting to log-in is actually the payer 30 and authorized to use the system. Authentication occurs using traditional security measures such as user-names, passwords, etc.

as is known in the art (S-530). If authentication fails, the session is either ended or the user is returned to the billing website to try to log-in again (S-535). Lock-out procedures can be implemented if too many incorrect log-in attempts are recorded or other security measures as is known in the art to ensure proper security. The authenticated user is directed to a payment screen 500 hosted by the CSP/BSP (S-540). Payer 30 is presented with the full statement detail of the bill and with an option to pay the bill electronically 300. Payment screen 500 may also have links to other information as shown in step S-575 and will be discussed in more detail below. Once payer 30 chooses to pay the bill on-line by clicking the appropriate link 300, an electronic payment request (S-555) is sent across communication network for ACH processing (S-565) which credits the biller's account on behalf of payer 30 (S-570). Other links may optionally be included to return payer to the main website 510 to view advertisements or informational messages selected by the biller 10.

If the CSP/BSP is hosting the service, payer 30 is directed to the CSP/BSP's website 520 (S-545) for authentication as above. Payer 30 who fails to be authenticated is either allowed to try the log-in procedure again or the session can be ended (S-560). As above, standard security measures are known in the art to ensure that payer 30 is authorized to use the service. If payer 30 is authenticated (S-550) he or she is directed to the payment screen 500 and given the option to pay electronically. As above, the payer 30 choosing to pay electronically, presses the appropriate link 300 which sends an electronic payment request (S-555) through a communication network to the ACH processing (S-565) which credits the biller's account on behalf of payer 30 (S-570).

As is known in the art, all security information as well as personal billing information is transmitted using security encryptions schemes such as secure sockets layer (SSL). Any secure username/pass-word and/or biometric schemes may be used to verify the identity of the payer 30. An Automated Clearing House (ACH) instruction is generated that debits the payer's account (e.g., a Demand Deposit Account (DDA)) and credits the biller's account. Access to the ACH is provided by securely connecting to the United States ACH Network through a Electronic Funds Transfer (EFT) Department. Alternatively, the user could make this payment via a credit card, funds transfer, or any other acceptable form of electronic payment. It is preferred that the CSP/BSP 20 that processes payments from payers 30 is a bank with established electronic links to the US ACH Network. It is possible, however, for a non-bank to practice the present invention by establishing their own link to the US ACH Network.

As part of the ACH process, the biller is provided remittance data concerning the transaction. If the payer is a customer of the CSP/BSP 20, then internal book entries can take the place of an ACH and no ACH is generated. Of course the payer 30 does not have to be a customer of the CSP/BSP 20. While there is no requirement that the payer 30 be a customer of the CSP/BSP 20, a biller 10 utilizing the present invention would have to be a customer of the CSP/BSP 20. In the preferred embodiment, the CSP/BSP 20 is a bank, but a non bank can also function as the CSP/BSP 20. Additionally, the CSP can be a separate and distinct entity from the BSP, functioning together to perform the required services.

What is claimed is:

1. A method for effectuating bill presentment and payment comprising:

maintaining a billing database, the billing database containing detailed billing information with respect to at least one bill, the at least one bill reflecting an account of at least one payer with respect to at least one biller;

generating an electronic summary of the at least one bill using the detailed billing information;

formatting at least one portion of the electronic summary in the form of a remittance slip containing remittance data as is found in a traditional paper based bill, wherein the step of formatting further makes said remittance slip printable for use in a traditional method of payment of the at least one bill by the at least one payer;

generating an electronic notification with respect to the at least one bill, the electronic notification containing an address through which the billing database is accessed;

transmitting the electronic notification to the at least one payer;

said step of transmitting enabling a user device to present to the at least one payer an electronically-selectable option such that the payer can interactively elect (a) paying the at least one bill electronically or (b) printing said portion which is formatted as a printable remittance slip and mailing the remittance slip with a payment of the at least one bill; and if the payer selects to pay the at least one bill electronically, causing an electronic payment for the at least one bill to be initiated, and if the payer selects to pay the at least one bill in the traditional method of payment, making the formatted remittance slip available for printing.

2. The method according to claim 1, further comprising:
maintaining an Internet site, wherein the billing database containing the detailed billing information is maintained on the Internet site.

3. The method according to claim 2, wherein the Internet site is maintained by the at least one biller.

4. The method according to claim 2, wherein the Internet site is maintained by a Billing Service Provider (BSP) the BSP performing billing services for the at least one biller.

5. The method according to claim 2, wherein the Internet site is maintained by a Customer Service Provider (CSP) the CSP performing billing services for the at least one biller.

6. The method according to claim 2, wherein address through which the billing database is accessed is a Uniform Resource Locator (URL) address of the Internet site, the method further comprising:
providing the at least one payer with access to the Internet site through the URL; and
authenticating the at least one payer at the Internet site.

7. The method according to claim 6, further comprising:
allowing the at least one payer with the opportunity to pay the bill electronically on the Internet site.

8. The method according to claim 6, wherein the electronic notification is an e-mail message.

9. The method according to claim 6, wherein the step of authenticating the at least one payer requiring the at least one payer to enter a unique username and password.

10. The method according to claim 1, further comprising:
registering the at least one biller with a billing service provider (BSP), wherein the BSP interfaces with the at least one biller with respect to the presentment of the at least one bill; and
registering the at least one payer with a customer service provider (CSP), wherein the CSP interfaces with the at least one payer with respect to the payment of the at least one bill.

11. The method according to claim 10, wherein the BSP and CSP are the same entity.

12. The method according to claim 10, wherein the BSP is a bank.

13. The method according to claim 10, wherein the CSP is a bank.

14. The method according to claim 10, wherein there are a plurality of payers that have accounts with the at least one biller, the method further comprising:
transmitting the detailed billing information with respect to the plurality of payers from the at least one biller to the BSP.

15. The method according to claim 14, wherein the step of transmitting the detailed billing information further comprises:
transmitting the detailed billing information as a bulk file containing all of the detailed billing information for a specified period of time.

16. The method according to claim 15, wherein the specified period of time is one month.

17. The method according to claim 1, wherein the electronic summary information contains at least a name of the at least one biller, a statement date, a minimum amount due, a total amount due and a due date.

18. The method according to claim 1, further comprising:
registering the at least one payer with the at least one biller with respect to receiving the electronic notification of the present invention.

19. A method for effectuating electronic bill presentment and payment comprising the steps of:
registering at least one biller with a service provider;
maintaining a billing database the billing database containing detailed billing information with respect to at least one payer of the at least one biller;
maintaining an electronic site wherein the at least one payer can view the electronic site, the electronic site containing a display of the detailed billing information;
authenticating the at least one payer before allowing the at least one payer access to the display of detailed billing information;
generating an electronic summary of the at least one bill using the detailed billing information;
formatting at least one portion of the summary information as a remittance slip containing remittance data as is found in a traditional paper based bill, wherein the step of formatting further makes said remittance slip printable for use in a traditional method of payment of the at least one bill by the at least one payer;
generating an e-mail containing an electronic notification with respect to the at least one bill, the electronic notification containing an address through which the billing database may be is accessed;
transmitting the e-mail to the payer;
said step of transmitting enabling a user device to present to the at least one payer an electronically-selectable option such that the payer can interactively elect (a) paying the bill electronically or (b) printing said portion which is formatted as a printable remittance slip and mailing the remittance slip with a payment of the bill; and
if the payer selects to pay the at least one bill electronically, causing an electronic payment for the at least one bill to be initiated, and
if the payer selects to pay the at least one bill in the traditional method of payment, making the formatted remittance slip available for printing.

20. The method according to claim 19, wherein the service provider is a business service provider.

21. The method according to claim 19, wherein the service provider is a customer service provider.

22. The method according to claim 20, wherein the business service provider is a bank.

23. The method according to claim 21, wherein the customer service provider is a bank.

24. A system for effectuating bill presentment and payment, the system comprising:
- a billing database, the billing database containing detailed billing information with respect to at least one bill, the at least one bill reflecting an account of at least one payer with respect to at least one biller;
- a processor coupled to the billing database, the processor:
  - generating an electronic summary of the at least one bill using detailed billing information,
  - formatting at least one portion of the electronic summary in the form of a remittance slip containing remittance data as is found in a traditional paper based bill, wherein the processor further makes said remittance slip printable for use in a traditional method of payment of the at least one bill by the at least one payer,
  - generating an electronic notification containing an address through which the billing database is accessed;
- a communication network coupled to the processor, the processor transmitting the electronic notification to the at least one payer over the communication network and enabling a user device to present to the at least one payer an electronically-selectable option such that the payer can interactively elect (a) paying the at least one bill electronically or (b) printing said portion which is formatted as a printable remittance slip and mailing the remittance slip with a payment of the at least one bill; and
- the processor being further adapted to:
  - if the payer selects to pay the at least one bill electronically, cause an electronic payment for the at least one bill to be initiated, and
  - if the payer selects to pay the at least one bill in the traditional method of payment, make the formatted remittance slip available for printing.

25. The system as recited in claim 24 further comprising:
- an Internet site, wherein the database containing the detailed billing information is maintained on the Internet site.

26. The system as recited in claim 25, wherein the Internet site is maintained by the at least one biller.

27. The system as recited in claim 25, wherein the Internet site is maintained by a billing service provider (BSP) the BSP performing billing services for the at least one biller.

28. The system as recited in claim 25, wherein the Internet site is maintained by a customer service provider (CSP) the CSP performing billing services for the at least one biller.

29. The system according to claim 25, wherein address through which the billing database is accessed is a Uniform Resource Locator (URL) address of the Internet site, wherein the processor provides the at least one payer with access to the Internet site through the URL, and wherein the processor authenticates the at least one payer at the Internet site.

30. The system according to claim 29, wherein, the processor allows the at least one payer with the opportunity to pay the bill electronically on the Internet site.

31. The system according to claim 29, wherein the electronic notification is an e-mail message.

32. The system according to claim 29, wherein the step of authenticating the at least one payer requiring the at least one payer to enter a unique username and password.

* * * * *